US005137489A

United States Patent [19]

Boster

[11] Patent Number: 5,137,489

[45] Date of Patent: Aug. 11, 1992

[54] LOW PRESSURE CONTINUOUS FEED SCREW PRESS

[76] Inventor: Daniel D. Boster, P.O. Box 6, Sheldon, Iowa 51201

[21] Appl. No.: 502,801

[22] Filed: Mar. 30, 1990

[51] Int. Cl.[5] A23P 1/00

[52] U.S. Cl. 452/198; 100/121

[58] Field of Search 452/198; 100/121, 117; 366/75, 297

[56] References Cited

U.S. PATENT DOCUMENTS 1,781,250 11/1930 Schwarz 100/121
3,737,151 6/1973 Schaeffier et al. 366/75
3,741,772 6/1973 McFarland 452/138
4,150,617 4/1979 Schramm et al. 100/117
4,846,054 6/1989 Mange et al. 366/75

Primary Examiner—Willis Little

[57] ABSTRACT

A press for reducing the volume and moisture content of waste material from the paunch of slaughtered meat animals. The press is principally a spiral press having bars extending from the screen to serve a dual purpose in controlling rotation of the material and separating the material as it passes through the press. A novel control to determine and regulate the pressure applied to the material is also provided.

12 Claims, 2 Drawing Sheets

LOW PRESSURE CONTINUOUS FEED SCREW PRESS

BACKGROUND AND SUMMARY OF THE INVENTION

This invention pertains to waste disposal apparatus, and more particularly to a device for separating liquid material from solids in the contents of the paunch of slaughtered meat animals.

One of the problems in the preparation of meat is the disposal of material not usable as meat. Much of such material such as hides, hoofs, etc. is usable as a by-product of the principal product, but some material is, as yet, completely unusable. One such material is the paunch manure, contents of the alimentary tract at the time the animal is slaughtered. Such material is commonly loaded onto trucks and is hauled to a disposal site.

By my invention, I provide a means by which the volume of material is greatly reduced simply by extracting the liquid. The liquid can then be treated in an ordinary waste-water treatment facility. The solids, in turn, occupy much less space and can be loaded into less space and the hauling greatly reduced. It may even be possible to use the solid material as a fertilizer.

FIGURES

Figure 2:
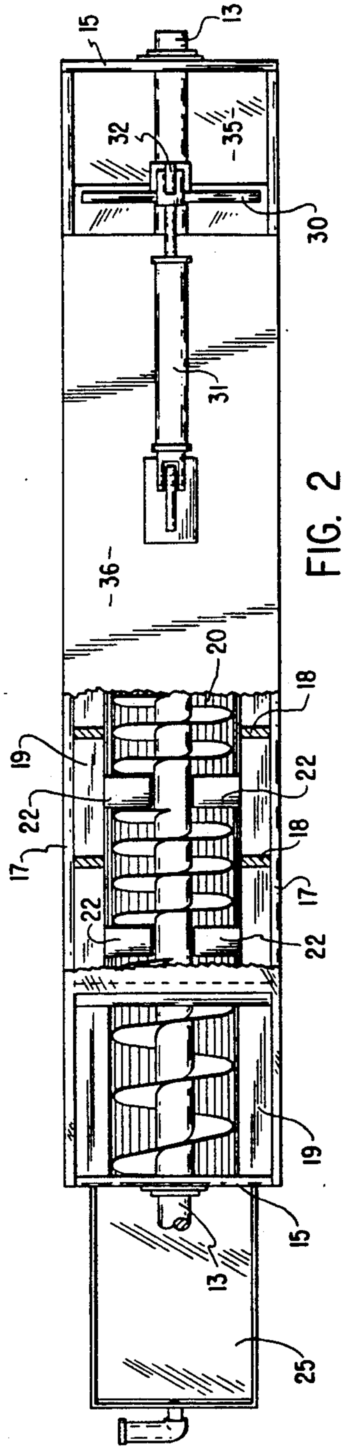
Figure 1:
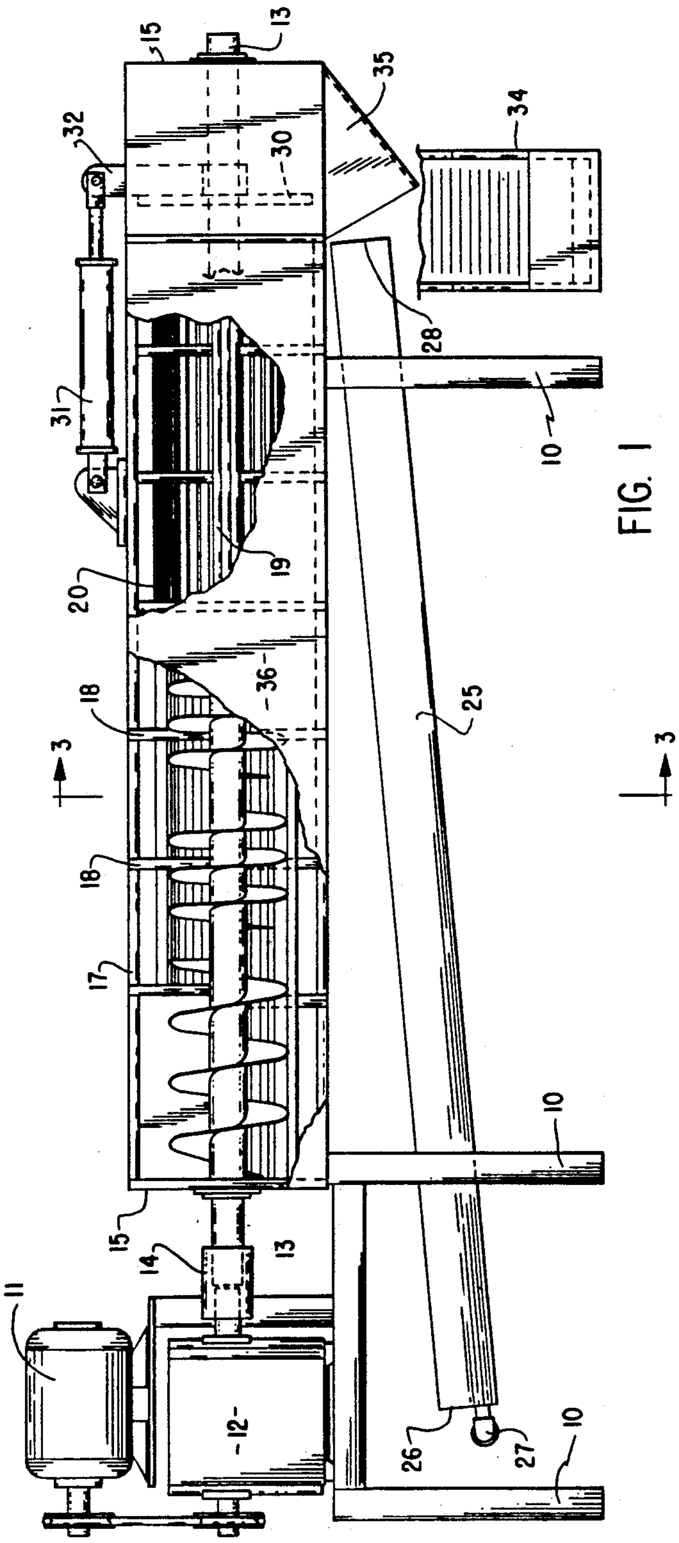
Figure 3:
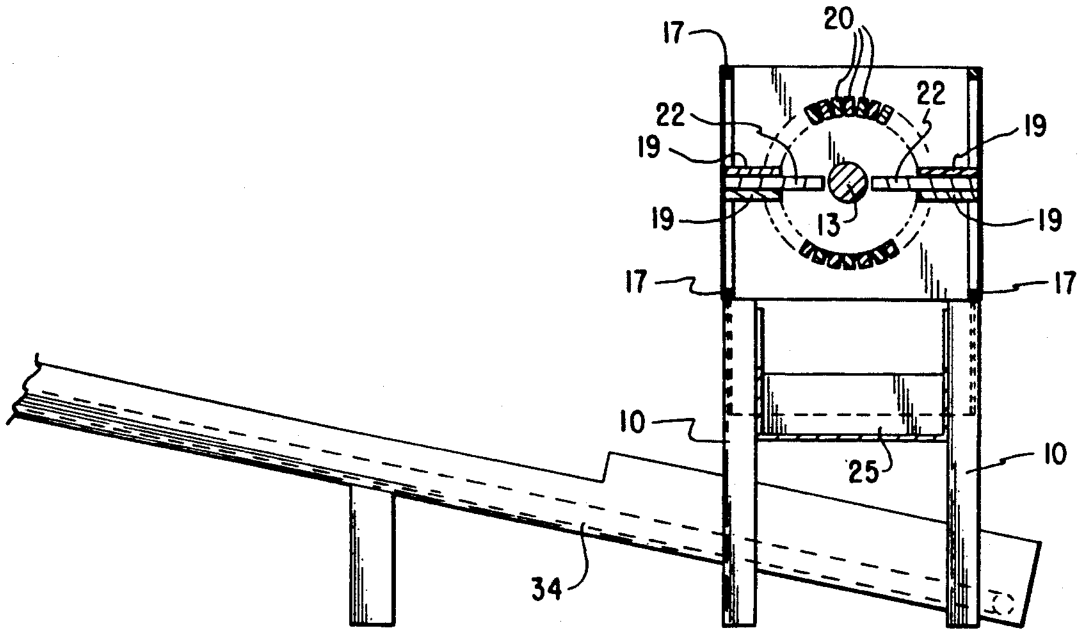

FIG. 1 is an elevational view of the device of my invention with parts being broken away to show underlying parts, FIG. 2 is a top plan view of the device also with parts broken away, and FIG. 3 is a view from line 3—3 of FIG. 1.

DESCRIPTION

Briefly my invention comprises a pressing device adapted to press the liquid from certain mixtures. The device operates at a relatively low pressure and includes a mechanism for controlling that pressure.

More specifically and referring to the drawings, the device is adapted to be mounted above the floor on legs 10. At one end is mounted a motor 11 and gear box 12. It will be recognized that a geared motor or other device may be used to drive the device.

The gear box drives a shaft 13 through a coupling 14. The shaft is journalled in end plates 15 at each end of the press. A supporting framework composed of longitudinal stringers 17 and a series of intermediate bulkheads 18 also extends between the end plates 15. Stiffeners 19 on opposite sides of the device also serve to strengthen the assembly.

Between the bulkheads are a series of bars 20 arranged to form a cylindrical tunnel extending from one end plate to the other. At the motor end, the bars form only the lower half of the tunnel leaving a delivery hopper with an open upper half. The bars are closely spaced circumferentially, open enough so that liquid will drain between them, but close enough so that nearly all solid matter will be strained out. It will be evident that a perforated screen could be used as a strainer in place of the close-spaced bars if desired.

The shaft 13 extends centrally through the tunnel formed by the bars, and carries several lengths of spiral flighting 21 adapted to move any material away from the delivery hopper. This flighting preferably is of different pitch with the closer spacing being at the compression end—opposite the hopper. I have discovered that a 6-inch spacing at the hopper end and a 3-inch spacing for the rest of the tunnel works satisfactorily.

It is necessary, however, to provide at suitable intervals along the tunnel, pairs of knife bars 22 extending from the circumference of the tunnel nearly to the shaft 13. These may be relatively stiff pieces extending into the flow of material within the tunnel. They thus function to mix the material and to break up any lumps of material which may be forming between the vanes of the flighting. In that way, the material is better pressed so that more liquid is removed. Tests indicate that these bars should extend from the outside of the tunnel almost to the shaft. They also should be spaced axially no farther apart than approximately three feet.

Beneath the bars 20 forming the tunnel, a trough 25 is provided in position to receive the liquid running from between the bars. This trough is sloped so that the liquid runs to a lower end 26 where a pipe 27 may be attached to drain the trough to a waste water treatment plant for disposal of that part of the material. Nearly any type of plant for treatment of waste water will purify this liquid so that such disposal becomes easy.

The trough 25 at its upper end 28 is disposed under the end of the bars 20. At this end, a pressure control device controls the discharge of the remaining solid materials. That control device includes a pressure plate 30 slidably disposed on the shaft 13 and adapted to slide from a closed position adjacent the ends of the tunnel formed by the bars 20 to open positions remote from those ends.

The position of the plate 30 controls the rate of discharge of the solid material from the tunnel by controlling the gap between the ends of the bars 20 and the plate 30. It also can control the pressure applied to the solid material in the tunnel by the means illustrated. That means includes a pneumatic cylinder and piston assembly 31 attached to the plate 30 by an arm 32.

It will be obvious that by using a compressible fluid such as air in the cylinder of the assembly 31, the pressure on the plate 30 will cause movement of the piston in the assembly until some balance is reached between the force on the plate 30 and the force on the piston caused by compression in the assembly 31. If a simple closed cylinder to hold an increasing pressure does not provide sufficient movement for easy control of the position of the plate, exterior controls such as valves for the release or introduction of air out of or into the cylinder can be provided.

An elevator 34 or similar device may be located below a discharge chute 35 to receive the pressed solid material. This elevator can move the solids from the discharge chute 35 to a bin, waiting truck or the like. It will be obvious that the bulk of the material to be disposed of will be greatly reduced by the removal of the liquid making disposal greatly reduced by the removal of the liquid making disposal of that solid waste considerably less clumsy, and consequently less expensive.

It may be desirable to cover the tunnel part of the machine by sheet metal or similar cover 36 to contain spattering liquid. Such cover is well within the skill of the ordinary mechanic in this art.

I claim as my invention:

1. A press device for pressing liquid from a mixed mass of solid and liquid material comprising a tunnel having permeable walls formed along substantially all their length to allow liquid material to flow through said walls while entrapping solid material, driven sugar means within said tunnel adapted to drive said material through said tunnel, said auger means including special flighting of at least two different pitches, the coarsest pitch of said flighting being nearest the end to which the material is first delivered, and the finest pitch being nearest the end from which the material is to be discharged, said flighting being in a plurality of separate segments, and stationary mixing means extending from said walls between said segments adapted to interfere with the steady flow of material through said tunnel.

2. The press device of claim 1 in which pressure controlling means is adapted to press against said material at the end of said tunnel from which said material is discharged.

3. The press device of claim 1 in which said auger means is mounted on and driven by a driven shaft, said mixing means including bar means extending from said walls of said tunnel almost to said shaft, said separated segments being located to run on both sides of said bar means, said bar means including a plurality of bars spaced axially along said walls.

4. The press device of claim 3 in which said bar means are spaced no more than three feet apart.

5. A press device for pressing liquid from a mixed mass of solid and liquid material comprising a tunnel having permeable walls formed along substantially all of their length to allow liquid material to flow through said walls while entrapping solid material, driven auger means within said tunnel adapted to drive said materials through said tunnel, said auger means including spiral flighting of at least two different pitches, the coarsest pitch of said flighting being nearest the end to which the material is first delivered and the finest pitch being nearest the discharge end from which the material is discharged, said walls being composed of a series of closely spaced longitudinal bars.

6. The press device of claim 5 in which said longitudinal bars are supported at intervals by bulkheads surrounding said tunnel.

7. A press device for pressing liquid from a mixed mass of solid and liquid material comprising a tunnel having permeable walls formed along substantially all of their length to allow liquid material to flow through said walls while entrapping solid material, driven auger means within said tunnel adapted to drive said materials through said tunnel, said auger means including spiral flighting of at least tow different pitches, the coarsest pitch of said flighting being nearest the end to which the material is first delivered and the finest pitch being nearest the discharge end from which the material is discharged, pressure controlling means means adapted to press against said material at the end of said tunnel from which said material is discharged, said pressure controlling means including a plate adjacent the discharge end of said tunnel adapted to substantially close said discharge end, pneumatic pressure means connected to said plate, movement of said plate away form said discharge end being resisted by said pneumatic means whereby the pressure on said plate by said material can be controlled.

8. The press device of claim 7 in which said auger means includes a driven shaft extending centrally and axially of said tunnel, said flighting being mounted on said shaft, and said plate is slidably mounted on said shaft.

9. The press device of claim 8 in which trough means extends below said tunnel in position to receive said liquid material form the walls of said tunnel.

10. The press device of claim 9 in which said trough is tilted having a higher end and a lower end, pipe means at said lower end being adapted to conduct said liquid material from said trough.

11. The press device of claim 10 in which a discharge chute at the discharge end of said tunnel is adapted receive said solid material for direction away from said tunnel.

12. A press device for pressing liquid from a mixed mass of solid and liquid material comprising a tunnel having walls adapted to allow liquid material to flow through said walls while entrapping solid material, driven auger means within said tunnel adapted to drive said materials through said tunnel, said tunnel having a delivery end to which said material is delivered and a discharge end from which said solid material is discharged, pressure control means at said discharge end including a plate adapted substantially to close said discharge end and pneumatic pressure means engaging said plate whereby the pressure against said plate can be controlled.

* * * * *